(12) United States Patent
Robinson et al.

(10) Patent No.: US 10,365,861 B2
(45) Date of Patent: Jul. 30, 2019

(54) SYSTEM AND METHOD FOR AUTOMATED SHOP PRINT SYSTEM SETUP DISTRIBUTION

(71) Applicant: Xerox Corporation, Norwalk, CT (US)

(72) Inventors: David C. Robinson, Penfield, NY (US); Raju Seetharam, Pittsford, NY (US); Steven E. Haehn, Rochester, NY (US); Jegan Joseph, Tamil Nadu (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/350,510

(22) Filed: Nov. 14, 2016

(65) Prior Publication Data

US 2018/0136888 A1    May 17, 2018

(51) Int. Cl.
| | |
|---|---|
| *G06F 15/00* | (2006.01) |
| *G06F 3/12* | (2006.01) |
| *H04N 1/60* | (2006.01) |
| *H04N 1/46* | (2006.01) |

(52) U.S. Cl.
CPC ............ *G06F 3/1204* (2013.01); *G06F 3/126* (2013.01); *G06F 3/1232* (2013.01); *G06F 3/1285* (2013.01); *H04N 1/46* (2013.01); *H04N 1/6008* (2013.01); *H04N 2201/0094* (2013.01)

(58) Field of Classification Search
CPC .... G06F 3/1254; G06F 3/1204; G06F 3/1207; G06F 3/1211; G06F 3/1273
USPC ...................................................... 358/1.15
See application file for complete search history.

(56) References Cited

U.S. PATENT DOCUMENTS

| | | | |
|---|---|---|---|
| 6,529,286 B1* | 3/2003 | King ................... | G06K 15/00 358/1.1 |
| 6,621,589 B1* | 9/2003 | Al-Kazily ............ | G06F 3/1205 358/1.15 |
| 6,671,069 B1* | 12/2003 | Kurosawa .......... | H04N 1/32459 358/1.9 |
| 7,079,266 B1 | 7/2006 | Rai et al. | |
| 7,125,179 B1 | 10/2006 | Rai et al. | |
| 8,384,927 B2* | 2/2013 | Harmon ............... | G06F 3/1204 358/1.15 |
| 9,423,989 B2 | 8/2016 | Rai | |
| 2003/0007178 A1* | 1/2003 | Jeyachandran ....... | G06K 15/00 358/1.15 |
| 2005/0018249 A1* | 1/2005 | Miura .................. | G06Q 10/10 358/1.15 |
| 2005/0065830 A1 | 3/2005 | Duke et al. | |

(Continued)

*Primary Examiner* — Mark R Milia
(74) *Attorney, Agent, or Firm* — Loza & Loza LLP; Kevin L. Soules; Kermit D. Lopez

(57) ABSTRACT

A method and system for automating print system setup and distribution comprises at least one print system and a computer system comprising a processor, a data bus coupled to the processor, and a computer-usable medium embodying computer program code, the computer-usable medium being coupled to the data bus, the computer program code comprising instructions executable by the processor and configured for: collecting at least one incoming print job, analyzing the at least one incoming print job to determine at least one job characteristic, determining an optimal print engine solution according to a configuration of the at least one print system and the determined at least one job characteristic, notifying a user of the optimal print engine solution, and rendering the jobs.

20 Claims, 5 Drawing Sheets

(56) References Cited

U.S. PATENT DOCUMENTS

| | | | | |
|---|---|---|---|---|
| 2005/0102442 A1* | 5/2005 | Ferlitsch | ............... | G06F 3/1204 |
| | | | | 710/15 |
| 2005/0243343 A1* | 11/2005 | Ng | ............... | H04N 1/54 |
| | | | | 358/1.9 |
| 2007/0182988 A1* | 8/2007 | Maeda | ............... | G06F 3/1208 |
| | | | | 358/1.15 |
| 2007/0229896 A1* | 10/2007 | Fujimori | ............... | G06F 3/1205 |
| | | | | 358/1.16 |
| 2008/0144084 A1 | 6/2008 | Rai | | |
| 2012/0188587 A1 | 7/2012 | Gaertner et al. | | |
| 2015/0242176 A1* | 8/2015 | Naik | ............... | H04L 67/16 |
| | | | | 358/1.15 |

* cited by examiner

SYSTEM AND METHOD FOR AUTOMATED SHOP PRINT SYSTEM SETUP DISTRIBUTION

TECHNICAL FIELD

Embodiments are generally related to the field of printing. Embodiments are also related to methods and systems for automated printing. Embodiments are further related to managing print systems. Embodiments are further related to managing print systems with multiple interchangeable colorants. Embodiments are additionally related to automated print job management and distribution.

BACKGROUND

Previous print systems were configured to print by combining a limited number of colorants to form a variety of colors. Such print systems were classically configured with four process colorants. However, this limited the total number of colors such print systems were capable of rendering.

As a result, certain newer print systems are capable of adding a fifth process colorant for printing. The available colorants for the fifth housing might be, for example, Orange, Green, Clear, and Blue. Other print systems may be capable of adding a fifth or sixth colorant for printing. In such print system, the available colorants for the fifth and sixth housings could be, for example, Gold, Silver, White, and Clear.

In some cases, the advantage of adding additional colorants to the additional housings is limited because a print shop is required to readjust the housing configuration each time a new call for a certain job is made. This is both time consuming and inefficient.

Therefore, there is a need in the art for systems and methods that triages jobs submitted to a print shop to determine the required additional colorants allowing print shops' print engines to be setup with the additional colorants.

BRIEF SUMMARY

The following summary is provided to facilitate an understanding of some of the innovative features unique to the embodiments disclosed and is not intendedi to be a full description. A full appreciation of the various aspects of the embodiments can be gained by taking the entire specification, claims, drawings, and abstract as a whole.

It is, therefore, one aspect of the disclosed embodiments to provide a method and system for printing.

It is another aspect of the disclosed embodiments to provide a method and system for automating a print shop setup, distribution, and production.

It is yet another aspect of the disclosed embodiments to provide an enhanced method and system for optimizing a print shop setup, distribution, and production.

The aforementioned aspects and other objectives and advantages can now be achieved as described herein. A method and system for automating print system setup and distribution comprises at least one multifunction device and a computer system comprising a processor, a data bus coupled to the processor, and a computer-usable medium embodying computer program code, the computer-usable medium being coupled to the data bus, the computer program code comprising instructions executable by the processor and configured for: collecting at least one incoming print job, analyzing the at least one incoming print job to determine at least one job characteristic, determining an optimal print engine solution according to a configuration of the at least one multifunction device and the determined at least one job characteristic, notifying a user of the optimal print engine solution, and rendering the jobs.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
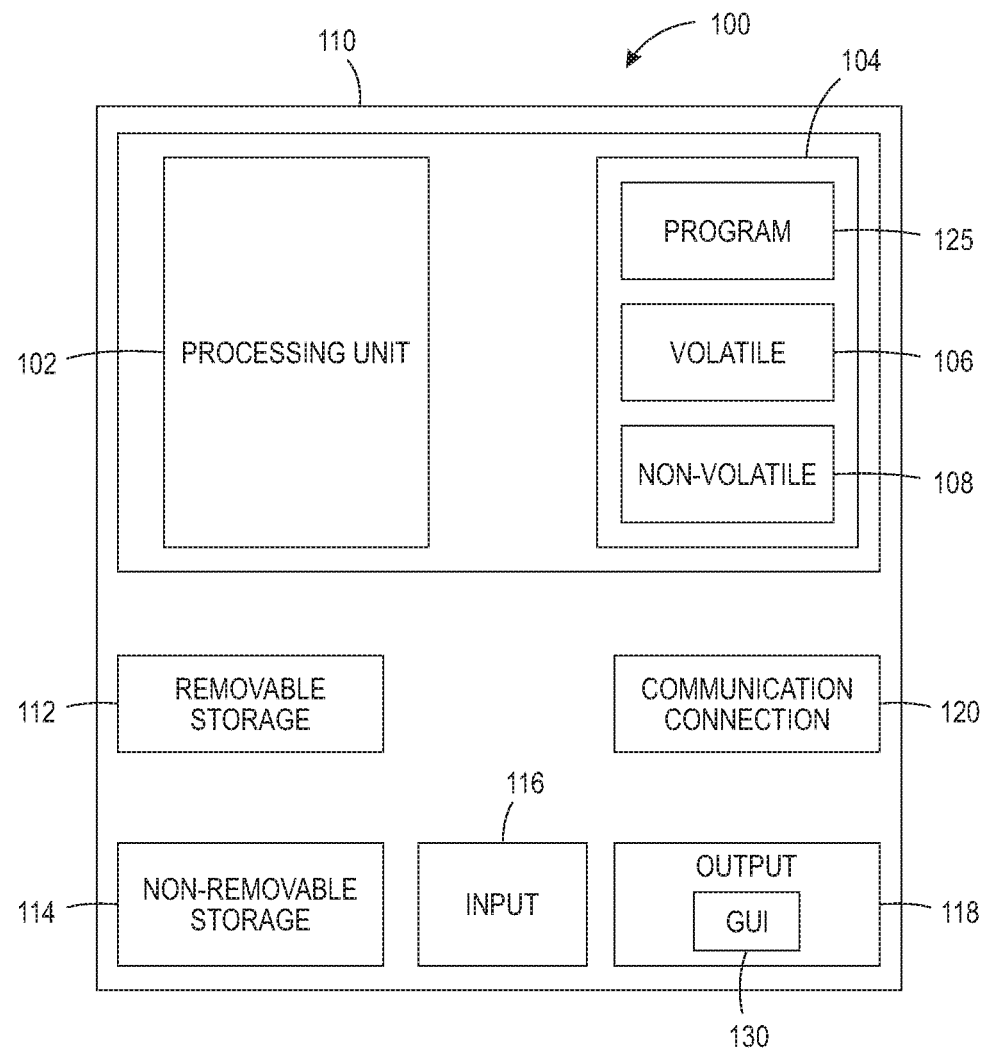
FIG. 1 depicts a block diagram of a computer system which is implemented in accordance with the disclosed embodiments.
Figure 2:
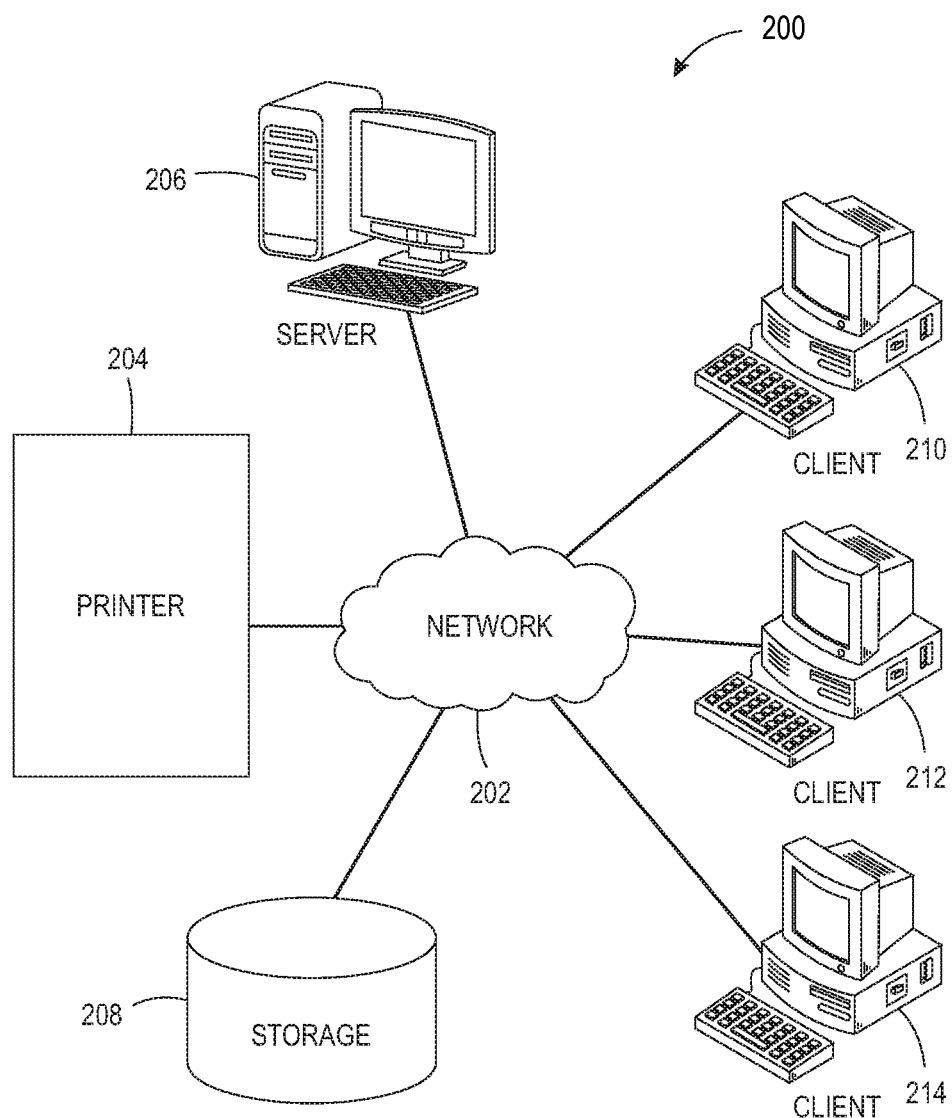
FIG. 2 depicts a graphical representation of a network of data-processing devices in which aspects of the present invention may be implemented.
Figure 3:
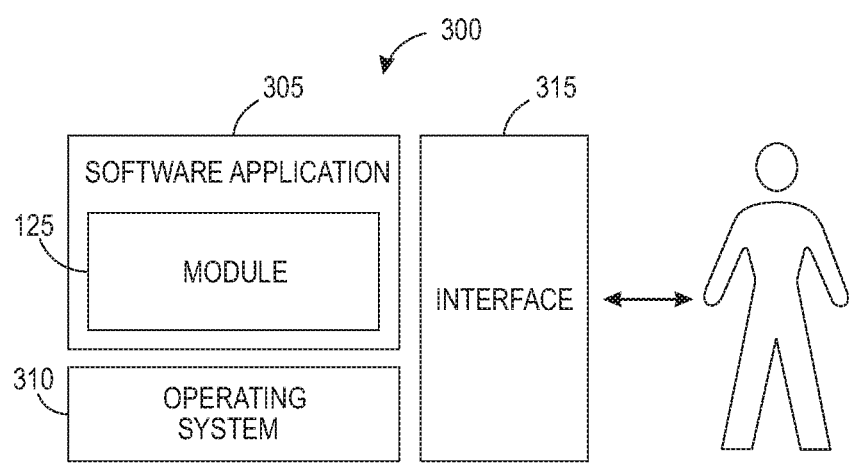
FIG. 3 depicts a computer software system for directing the operation of the data-processing system depicted in FIG. 1, in accordance with an example embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data, including data comprising frames of video.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a sensor, camera, accelerometer, gyroscope, multi-function device, printer, tracking device, or the like. In the embodiments disclosed herein a multi-function device can comprise a printer, print system, fax machine, copy machine, a scanner, or some combination thereof. The communication connection may include a Local Area Network (LAN), a Wide Area Network (WAN), or other networks. This functionality is described in more fully in the description associated with FIG. 2 below.

Output 118 is most commonly provided as a computer monitor, but may include any computer output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers 206, one or more external devices such as printer 204, and a memory storage unit such as, for example, memory or database 208.

In the depicted example, printer 204 and server 206 connect to network 202 along with storage unit 208. In addition, clients 210, 212, and 214 connect to network 202. These clients 210, 212, and 214 may be, for example, personal computers or network computers. Computer system 100 depicted in FIG. 1 can be, for example, a client such as client 210, 212, and/or 214. Alternatively clients 210, 212, and 214 may also be, for example, a camera, tracking device, sensor, accelerometer, gyroscope, multifunction device, printer, scanner, etc.

Computer system 200 can also be implemented as a server such as server 206, depending upon design considerations, in the depicted example, server 206 provides data such as boot files, operating system images, applications, and application updates to clients 210, 212, and 214, and/or to printer 204. Clients 210, 212, and 214 and printer 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a computer software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) 125, may be "loaded" (i.e., transferred from removable storage 112 into the memory 104) for execution by the data-processing system 100. The data-processing system 100 can receive user commands and data through user interface 315, which can include input 116 and output 118, accessible by a user. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 315 (e.g., a graphical user interface 130) can serve to display results, whereupon a user may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of a data-processing system such as computer system 100, in conjunction with program module 125, and data-processing system 200 and network 202 depicted in FIGS. 1-3. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Macintosh, UNIX, LINUX, and the like. Therefore, the descriptions of the exemplary embodiments, which follow, are for purposes of illustration and not considered a limitation.

The methods and systems disclosed herein take advantage of printing engines capable of printing with colorants beyond the standard cyan, magenta, yellow, and black (CMYK) process printing. With a standard CMYK printing system, the electronic file to be printed is broken into the four standard colors and the image is then recreated by applying dots of the four colors at various angles in order to recreate the original image as accurately as possible. CMYK printing systems are limited because they cannot exactly reproduce many colors.

In certain applications, such as logos, images, or some text, special colors may be desired. For example, it is preferable to render the color of a logo in exactly the same way all the time so that the value of the branding associated with the logo is maintained. In some cases, CMYK systems are not sufficient to properly render the exact desired color. In such cases, special colors can be rendered using certain rendering devices that are capable of loading additional colors. For example, in some embodiments print systems have the capability of adding a fifth process colorant for printing. The available colorants for the fifth housing can be orange, green, clear, and blue. In other embodiment the print system can have the capability of adding a fifth and sixth colorant for printing. The available colorants for the fifth and sixth housings can be gold, silver, white, and clear. In other embodiments, other systems capable of adding additional colorants may be used. Such additional colorants may include any color.

Calls for specific colors are commonly made according to a standardized color reproduction labeling system known as Pantone Color Matching. There are other similar color matching schemes available in the printing industry (e.g., Toyo). The idea behind Pantone color matching is to allow users to "color match" very specific colors when producing a product, regardless of the equipment used to produce the color. Pantone matching has been widely adopted as the standard for print design. Pantone standardization allows independent manufactures to ensure accurate color matching. The Pantone system was designed for offset ink based print systems where 13 base ink colors are mixed in defined proportions to create a Pantone named color ink. Toner based systems do not have the ability to mix base colorants to produce a new color. This is due to the complexity of designing electrostatic toners and the toner's interaction with the xerographic process.

The application of Pantone standardization in the CMYK process is particularly important. Base CMYK subtractive printing is based on the use of cyan, magenta, yellow, and black colorants for printing applications. CMYK is commonly used throughout the world for printing applications. A subset of Pantone colors can be color matched using CMYK. However, many of the Pantone system's spot colors cannot be simulated with CMYK and instead require a best match using the available CMYK colorants. When additional colorants are available (e.g., Blue) more Pantone colors can be matched or more closely represented during printing.

The advantage of the Pantone system is that colors can be consistently rendered across various devices. However, it is often inconvenient and time consuming to reconfigure a print system with the best set of toner colorants each time a new color is provided.

In an exemplary embodiment, systems and methods are used to analyze a selection of jobs submitted to a print shop in order to determine the optimal queue/colorant setup for each job's designated print system. The system can first pre-flight jobs submitted to a shop to determine spot, device, and separation calls specific to the job. The content of the calls (e.g., deviceN=green) are analyzed to determine the optimal print engine colorants for IQ for each job. Based on the assemblage of required colorants for the job, directions are sent to each print shop device specifying the colorant setup and print queue programming to efficiently render all of the jobs. The capability of the print shop's printers and the number of printers can also be considered to determine the optimal print engine setups and queuing.

Figure 4:
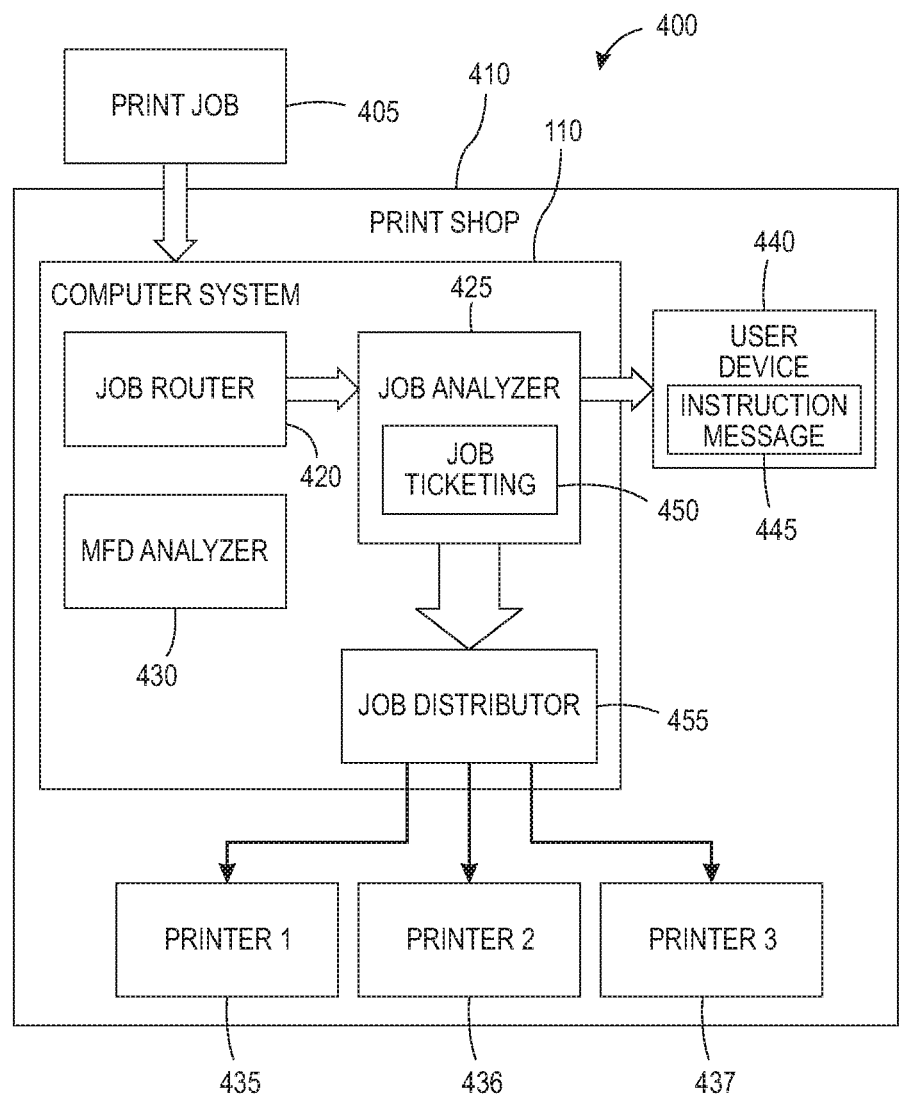
FIG. 4 depicts a system for rendering jobs in accordance with the disclosed embodiments.

FIG. 4 illustrates a system 400 for automating print shop setup and distribution in accordance with an embodiment. One or more print jobs 405 can be submitted to a print shop 410. It should be appreciated that the term print shop may refer to any arrangement of printers intended to render jobs. In certain embodiments, this can include a commercial enterprise intended to accept electronic documents and render them.

The one or more print jobs 405 are collected at a networked computer system 110. A job router module 420 can be configured to handle the collection of jobs as they are submitted to the print shop 410. The print jobs can be stored in a database or other such memory structure. The jobs are provided to a Job analyzer module 425. The job analyzer module 425 evaluates each print job 405 and extracts spot, device, and separation call content from the print job. The job analyzer module 425 further evaluates the separation and device calls to determine if they match a colorant name. The print job 405 can then be optimally conditioned for rendering via a specific type of print system (e.g., CMYK, CMYK+Orange, CMYK+Green, CMYK+Blue, etc.).

In addition, a multi-function device (MFD) analyzer module 430 is used to evaluate devices in the print shop, such as print system 435, print system 436, and print system 437 in the print shop 410. It should be appreciated that the print system may further comprise a virtual printer and a digital front end (DFE) which can include a rasterized image processor and an image output terminal (IOT) or other such marking engine. The print systems may be embodied as multifunction devices. The MFD analyzer module 430 can interrogate the printers to determine their respective rendering capabilities and current colorant configuration.

Once the rendering capabilities and current colorant configuration are determined for each printer, the print jobs can be sent to job distributor 455 via job ticketing module 450, which may be included in the job analyzer 425, for production according to a program for efficiently rendering the print jobs. Accordingly, the job distributor 455 can queue certain printers to render certain jobs. The printers can be selected to print select print jobs based on the assemblage of required colorants for the job. Directions can be sent to each printing device specifying the colorant setup. Additionally, a set of configuration instructions can be provided to a print shop worker via an instruction message 445 which can be embodied as an email, text message, voice message, web-page on a user device 440, detailing the instructions for altering printer configurations as necessary to efficiently render the documents provided to the job distributor 455. In an embodiment, the instructions 445 can be provided to a user device 440.

With the printers properly configured, the queued jobs in the job distributor 455 can be distributed to each printer. In some embodiments, local queues can be maintained on the printers when the printer is capable of storing queued jobs. The jobs can then be efficiently rendered at the various printers in the print shop. A print shop worker can follow the instructions 445 provided in order to reconfigure printers at certain points in the program as necessary. For example, the print shop worker may be required to exchange one colorant in a certain printer after a certain number of jobs have been rendered at that document, because the next jobs require a different optimized spot color colorant.

The embodiment allows the print shop to automate the system setup and distribution in order to more efficiently and more accurately render print jobs.

It is illustrative to review the process of the present embodiments via an example process flow. It should be appreciated that the following example is not intended to limit the scope of potential applications of the various embodiments disclosed herein. Any number of printers with varying capabilities may be employed in other embodiments.

In an exemplary case, three jobs may be submitted to a print shop. The jobs can be labeled "Job 1," "Job 2," and "Job 3." As the jobs are submitted to the print shop, the job router routes the jobs to the job analyzer. Each job is pre-flighted for spot, device, and separation call content. The spots are analyzed for accuracy. Separation and device calls are analyzed for matching a 5th colorant name. The rendering analyzer interrogates the available print engines in the print shop. The rendering analyzer may determine that the print engines include a CMYK, CMYK+Orange, CMYK+Green, and CMYK+Blue print engines.

The analysis of the print jobs in this example is provided in Table 1. It should be appreciated that deltaE represents a measurement of color accuracy.

Generally speaking, the difference or distance between two colors is a metric represented by deltaE. The deltaE metric quantifies the difference between colors. The standard quantification is indicative of the Euclidean distance between two colors in a device independent color space. Unempirically, a deltaE value of 1 is characteristic of a just noticeable difference (JND) between two colors. Higher deltaE values indicate a greater difference between the colors.

TABLE 1

|  | accuracy (deltaE) with CMYK destination profile | accuracy (deltaE) with CMYK + Orange destination profile | accuracy (deltaE) with CMYK + Green destination profile |
|---|---|---|---|
| job 1 |  |  |  |
| pantone 101C | 4 | 2 | 4 |
| pantone 300C | 3 | 3 | 3 |
| deviceN = green |  |  |  |
| Separation = green |  |  |  |
| job 2 |  |  |  |
| pantone 400 | 5 | 5 | 5 |
| pantone 500 | 4 | 4 | 4 |
| job 3 |  |  |  |
| pantone green | 7 | 7 | 2 |
| pantone orange | 7 | 2 | 7 |
| deviceN = orange |  |  |  |

The analysis of this data can progress as follows:
1) job 1=CMYK+green job (two green calls, one spot that benefits from orange vs. green);
2) job 2=CMYK job (no benefit from 5th colorants);
3) job 3=CMYK+orange job (one spot for green, one spot for orange, 1 deviceN call for orange).

Given the example data summarized in Table 1, the following occurs: a message can be sent to the print shop worker to setup one rendering device with CMYK+Orange and one device with CMYK+Green. The device setup with CMYK+Green is sent a queue setup for green printing and all spots are printed with CMYK—due to spots not benefiting from green. The device configured for CMYK+Orange is sent one queue setup for CMYK printing and one queue setup for orange printing and "Pantone Orange" to be printed with CMYK+Orange, all other spots are printed with CMYK.

The jobs are then submitted via job ticketing to the appropriate virtual printers (which can be a combination of a print engine and queue), where they are queued for rendering and transmitted to print shop devices to be rendered.

Figure 5:
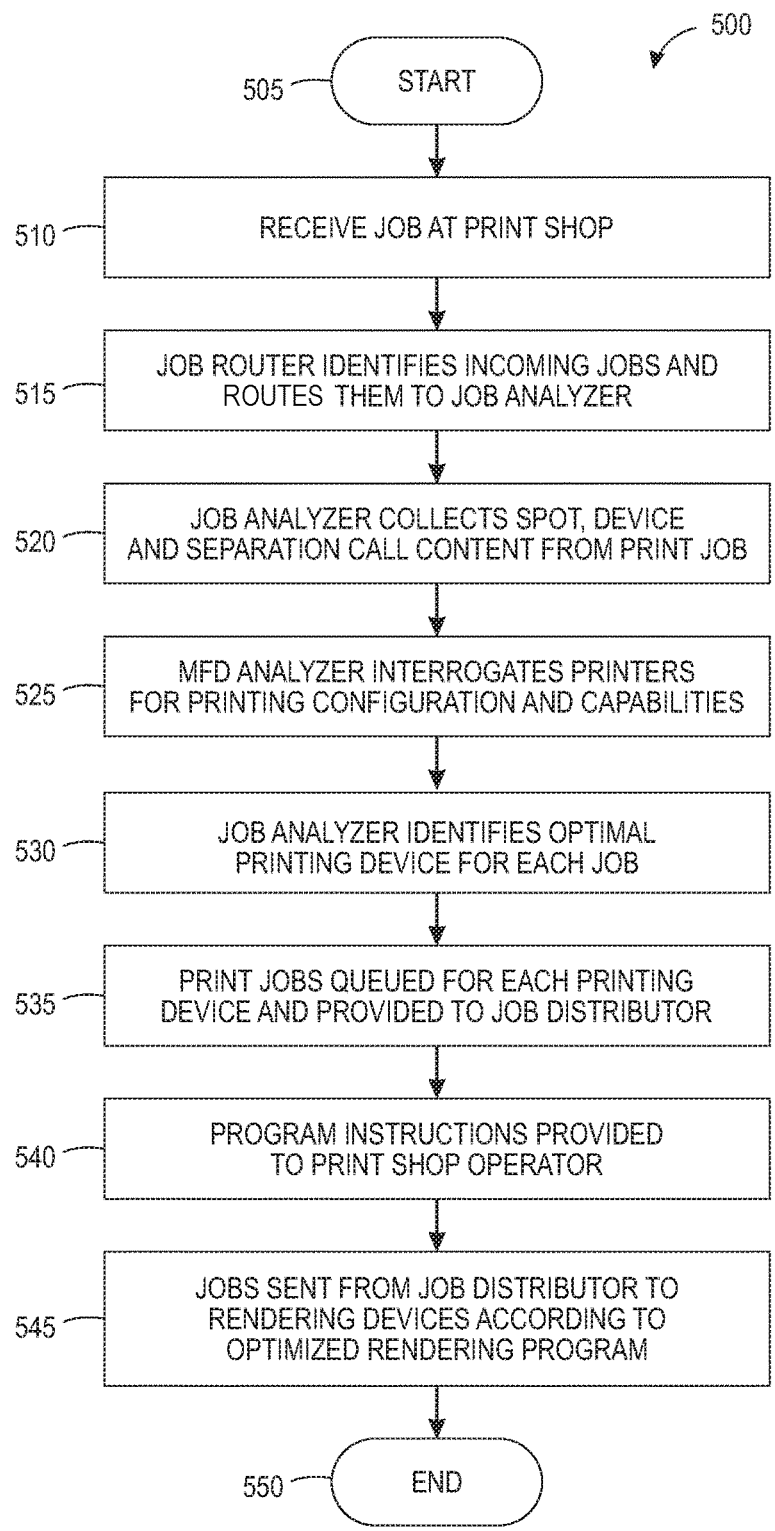
FIG. 5 depicts a flow chart illustrating logical operational steps for automatically rendering documents in accordance with the disclosed embodiments.

FIG. 5 illustrates a method 500 for automated print shop system setup, distribution, and production in accordance with an embodiment. The method begins at step 505.

At step 510, a print job is received at a print shop. In some embodiments, one or multiple print jobs can be received at a print shop. In certain embodiments, this can include receiving multiple print jobs as electronic files over a time period while the print shop is closed and/or during print shop operating hours. A job router can identify incoming jobs and automatically routes them to a job analyzer for further processing at step 515.

At step 520, the job analyzer collects spot, device, and separation call content from the one or more print jobs. At step 525, an MFD analyzer can interrogate printers in the print shop to determine printer configurations and capabilities. This can include identifying the print capabilities of the printer, available colorant housings, and available colorants. It should be appreciated that step 525 may be performed at any point in method 500 including in an offline stage during initialization of the print shop.

Once the job call content and the printer configuration and capabilities are known, the job identifier can identify the optimal printing device for each job at step 530 and produce a program for efficiently rendering the print jobs. The job analyzer can queue jobs with jobs that are optimized for the present printer configurations with a priority over jobs that will require reconfiguration of the print systems. The job analyzer can automatically configure printers to match the requirements of print jobs where such printers can be automatically configured and can provide instructions for reconfiguration of printers to print shop workers. This can include initial printer configurations as well as timing or sequencing of changes to printer configurations for optimized efficiency in rendering documents. Such printer configuration may include changing print settings (e.g., color, black and white, single or double sided printing, binding, collating, etc.).

In certain embodiments, additional print jobs may be received after the print program has been optimized by the job analyzer. In such circumstances, the job analyzer may incorporate such print jobs into the print program, while maintaining an optimal efficiency of the program.

With the optimal program prepared, the print jobs can be queued and job ticketing can be used to provide the jobs to a virtual printer at step 535. At step 540, program instructions can be sent to the print shop worker, detailing the print program and any necessary initialization or reconfiguration of the printers in the print shop. It should be understood that the program instructions can be provided to the print operator at any point after the program is determined. New instructions can also be provided to the print shop operator when the program is adjusted for new jobs provided midprogram.

At this point the optimal program can commence with the jobs being sent from the job distributor to the virtual printer to be rendered as illustrated at step 545. The method ends at step 550.

Based on the foregoing, it can be appreciated that a number of embodiments, preferred and alternative, are disclosed herein. For example, in one embodiment, a system comprising: at least one print system; a processor; a data bus coupled to the processor; and a computer-usable medium embodying computer program code, the computer-usable medium being coupled to the data bus, the computer program code comprising instructions executable by the processor and configured for collecting at least one incoming print job, analyzing the at least one incoming print job to determine at least one job characteristic, determining an optimal print engine solution according to a configuration of the at least one print system and the determined at least one job characteristic, and notifying a user of the optimal print engine solution.

In an embodiment, the at least one job characteristic comprises at least one of spot call content, device call content, deviceN call content, and separation call content.

In another embodiment, the system further comprises determining a number of device configurations and capabilities of the at least one print system. The system may further comprise selecting a best print option for each of the at least one incoming print jobs.

In another embodiment, determining an optimal print engine solution according to a configuration of the at least one print system and the determined at least one job characteristic further comprises recording each of the at least one job characteristics required for all the at least one incoming print jobs.

In another embodiment, the system comprises configuring the at least one print system according to the optimal print engine solution. In an embodiment, the system includes rendering the at least one incoming print job according to the optimal print engine solution.

In another embodiment, an automatic print method comprises collecting at least one incoming print job at a computer system, analyzing the at least one incoming print job to determine at least one job characteristic, determining an optimal print engine solution according to a configuration of the at least one print system and the determined at least one job characteristic, and notifying a user of the optimal print engine solution.

In an embodiment, at least one job characteristic comprises at least one of spot call content, device call content, deviceN, call content, and separation call content.

In an embodiment, the method further comprises determining a number of configurations and capabilities of the at least one print system. The method may also comprise selecting a best print option for each of the at least one incoming print jobs.

In another embodiment, determining an optimal print engine solution according to a configuration of the at least one print system and the determined at least one job characteristic further comprises recording each of the at least one job characteristics required for all the at least one incoming print jobs.

In an embodiment, the method may comprise configuring the at least one print system according to the optimal print engine solution and rendering the at least one incoming print job with at least one print system according to the optimal print engine solution.

In another embodiment, an automated printing apparatus comprises at least one print system coupled to a processor, a data bus coupled to the processor, and a computer-usable medium embodying computer program code, the computer-usable medium being coupled to the data bus, the computer program code comprising instructions executable by the processor and configured for: collecting at least one incoming print job, analyzing the at least one incoming print job to determine at least one job characteristic, determining an optimal print engine solution according to a configuration of the at least one print system and the determined at least one job characteristic, notifying a user of the optimal print engine solution, and rendering the at least one incoming print job according to the optimal print engine solution.

In an embodiment, the at least one job characteristic comprises at least one of spot call content, device call content, deviceN call content, and separation call content.

In an embodiment, the apparatus further comprises instructions for selecting a best print option for each of the at least one incoming print jobs.

In an embodiment, determining an optimal print engine solution according to a configuration of the at least one print system and the determined at least one job characteristic further comprises recording each of the at least one job characteristic required for all the at least one incoming print jobs and organizing the at least one incoming print jobs into a most efficient order.

In other embodiments, the apparatus further includes instructions for configuring the at least one print system according to the optimal print engine solution.

In an embodiment, notifying a user of the optimal print engine solution further comprises sending the user a program indicative of the print engine solution.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A system comprising:
   at least one print system comprising a plurality of rendering devices, each of said plurality of rendering devices having at least three print cartridge slots;
   a processor;
   a data bus coupled to said processor; and
   a computer-usable medium embodying computer program code, said computer-usable medium being coupled to said data bus, said computer program code comprising instructions executable by said processor and configured for:
   collecting at least one incoming print job;
   analyzing said at least one incoming print job to determine at least one job characteristic;
   determining an optimal print engine solution according to a configuration of said at least one print system and said determined at least one job characteristic, said configuration of said at least one print system comprising:
      a configuration of said at least three print cartridge slots associated with each of said plurality of rendering devices;
      an arrangement of a plurality of print cartridges in said at least three print cartridge slots associated with each of said plurality of rendering devices, wherein at least one of said print cartridges adds a process colorant to said respective rendering device;
   notifying a user of said optimal print engine solution, said optimal print engine solution further comprising instructions comprising an initial configuration of said plurality of rendering devices and instructions for changing said configuration of said print system at a predetermined time;
   modifying said optimal print engine solution as at least one new incoming print job is received; and
   notifying a user of said modification to said optimal print engine solution as said at least one new incoming print job is received.

2. The system of claim 1 wherein said at least one job characteristic comprises:
   spot call content;
   device call content;
   deviceN call content; and
   separation call content.

3. The system of claim 1 further comprising instructions executable by said processor and configured for:
   determining a number of device configurations, said number of device configurations comprising said at least three print cartridge slots associated with each of said plurality of rendering devices, said plurality of print cartridges, a color of said process colorant associated with said at least one of said print cartridge adding a process colorant, and capabilities of each said plurality of rendering devices.

4. The system of claim 1 further comprising instructions executable by said processor and configured for:
   selecting an optimal queue and an optimal colorant setup for each of said plurality of rendering devices according to said at least one incoming print jobs.

5. The system of claim 2 wherein determining an optimal print engine solution according to a configuration of said at least one print system and said determined at least one job characteristic further comprises:
   recording each of said at least one job characteristic required for all said at least one incoming print jobs; and
   selecting one of said plurality of rendering devices for each of said at least one incoming print jobs, that is an optimal rendering device for each of said at least one incoming print jobs according to said at least one job characteristic required for said at least one incoming print job.

6. The system of claim 1 further comprising:
   reconfiguring said print cartridge configuration of said plurality of rendering devices according to said optimal print engine solution at said predetermined time.

7. The system of claim 1 further comprising:
   submitting a job ticket for said at least one incoming print job to one of said plurality of rendering devices according to said optimal print engine solution;
   rendering said at least one incoming print job with said rendering device according to said optimal print engine solution.

8. An automatic print method said method comprising:
   collecting at least one incoming print job at a computer system;
   analyzing said at least one incoming print job to determine at least one job characteristic;
   determining an optimal print engine solution according to a configuration of at least one print system and said determined at least one job characteristic, said print system comprising a plurality of rendering devices, each of said plurality of rendering devices having at least three print cartridge slots, said configuration of said at least one print system comprising a configuration of said at least three print cartridge slots associated with each said plurality of rendering devices, and an arrangement of a plurality of print cartridges in said at least three print cartridge slots associated with each said plurality of rendering devices, wherein at least one of said print cartridges adds a process colorant to said print system and said respective rendering device;
   notifying a user of said optimal print engine solution, said optimal print engine solution further comprising instructions comprising an initial configuration of said plurality of rendering devices and instructions for changing said configuration of said print system at a predetermined time;
   modifying said optimal print engine solution as at least one new incoming print job is received; and
   notifying a user of said modification to said optimal print engine solution as said at least one new incoming print job is received.

9. The method of claim 8 wherein said at least one job characteristic comprises:
   spot call content;
   device call content;

deviceN call content; and
separation call content.

10. The method of claim 8 further comprising:
determining a number of configurations, said number of device configurations comprising said at least three print cartridge slots associated with each of said plurality of rendering devices, said plurality of print cartridges, a color of said process colorant associated with said at least one of said print cartridge adding a process colorant, and capabilities of each said plurality of rendering devices.

11. The method of claim 8 further comprising:
selecting an optimal queue and an optimal colorant setup for each of said plurality of rendering devices according to said at least one incoming print job.

12. The method of claim 9 wherein determining an optimal print engine solution according to a configuration of said at least one print system and said determined at least one job characteristic further comprises:
recording each of said at least one job characteristic required for all said at least one incoming print jobs; and
selecting one of said plurality of rendering devices for each of said at least one incoming print jobs, that is an optimal rendering device for each of said at least one incoming print jobs according to said at least one job characteristic required for said at least one incoming print job.

13. The method of claim 8 further comprising:
reconfiguring said print cartridge configuration of said plurality of rendering devices according to said optimal print engine solution at said predetermined time.

14. The method of claim 8 further comprising:
submitting a job ticket for said at least one incoming print job to one of said plurality of rendering devices according to said optimal print engine solution;
rendering said at least one incoming print job with at least one print system according to said optimal print engine solution.

15. An automated printing apparatus, said apparatus comprising:
at least one print system comprising a plurality of rendering devices, each of said plurality of rendering devices having at least three print cartridge slots, coupled to a processor;
a data bus coupled to said processor; and
a computer-usable medium embodying computer program code, said computer-usable medium being coupled to said data bus, said computer program code comprising instructions executable by said processor and configured for:
collecting at least one incoming print job;
analyzing said at least one incoming print job to determine at least one job characteristic;
determining an optimal print engine solution according to a configuration of said at least one print system and said determined at least one job characteristic, said configuration of said at least one print system comprising:
a configuration of said at least three print cartridge slots associated with each of said plurality of rendering devices; and
an arrangement of a plurality of print cartridges in said at least three print cartridge slots associated with each of said plurality of rendering devices, wherein at least one of said print cartridges adds a process colorant to said respective rendering device;
notifying a user of said optimal print engine solution, said optimal print engine solution further comprising instructions comprising an initial configuration of said plurality of rendering devices and instructions for changing said configuration of said print system at a predetermined time;
modifying said optimal print engine solution as at least one new incoming print job is received;
notifying a user of said modification to said optimal print engine solution as said at least one new incoming print job is received; and
rendering said at least one incoming print job according to said optimal print engine solution.

16. The apparatus of claim 15 wherein said at least one job characteristic comprises:
spot call content;
device call content;
deviceN call content; and
separation call content.

17. The apparatus of claim 15 further comprising instructions executable by said processor and configured for:
selecting an optimal queue and an optimal colorant setup for each of said plurality of rendering devices according to said at least one incoming print jobs.

18. The apparatus of claim 16 wherein determining an optimal print engine solution according to a configuration of said at least one print system and said determined at least one job characteristic further comprises:
recording each of said at least one job characteristic required for all said at least one incoming print jobs;
organizing said at least one incoming print job into a most efficient order; and
selecting one of said plurality of rendering devices for each of said at least one incoming print jobs, that is an optimal rendering device for each of said at least one incoming print jobs according to said at least one job characteristic required for said at least one incoming print job.

19. The apparatus of claim 15 further comprising:
reconfiguring said print cartridge configuration of said plurality of rendering devices according to said optimal print engine solution at said predetermined time.

20. The apparatus of claim 15 wherein notifying a user of said optimal print engine solution further comprises:
submitting a job ticket for said at least one incoming print job to one of said plurality of rendering devices according to said optimal print engine solution.

* * * * *